US010329201B2

(12) United States Patent
Steibel et al.

(10) Patent No.: US 10,329,201 B2
(45) Date of Patent: Jun. 25, 2019

(54) CERAMIC MATRIX COMPOSITE ARTICLES FORMATION METHOD

(71) Applicant: General Electric Company, Schenectady, NY (US)

(72) Inventors: James Dale Steibel, Mason, OH (US); Suresh Subramanian, Clifton Park, NY (US); Suresh Viswanathan, Mason, OH (US); Jared Hogg Weaver, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/710,965

(22) Filed: Sep. 21, 2017

(65) Prior Publication Data

US 2019/0084891 A1 Mar. 21, 2019

(51) Int. Cl.
| | |
|---|---|
| C23C 16/30 | (2006.01) |
| C04B 35/80 | (2006.01) |
| C04B 35/626 | (2006.01) |
| B32B 18/00 | (2006.01) |
| B32B 7/02 | (2019.01) |

(52) U.S. Cl.
CPC ............ C04B 35/806 (2013.01); B32B 7/02 (2013.01); B32B 18/00 (2013.01); C04B 35/6267 (2013.01); B32B 2264/108 (2013.01); C04B 2235/3826 (2013.01); C04B 2235/422 (2013.01); C04B 2235/614 (2013.01)

(58) Field of Classification Search
CPC .... C23C 16/30; C23C 16/325; C23C 14/0635
See application file for complete search history.

(56) References Cited

U.S. PATENT DOCUMENTS

| | | | |
|---|---|---|---|
| 4,005,575 A | 2/1977 | Scott et al. | |
| 4,909,031 A | 3/1990 | Grieb | |
| (Continued) | | | |

FOREIGN PATENT DOCUMENTS

| | | |
|---|---|---|
| EP | 1 059 274 A1 | 12/2000 |
| EP | 3 061 736 A1 | 8/2016 |
| WO | 2014/143649 A1 | 9/2014 |

OTHER PUBLICATIONS

Xu, Yongdong, et al., "Microstructure and mechanical properties of three-dimensional carbon/silicon carbide composites fabricated by chemical vapor infiltration". Carbon, vol. 36, No. 7-8, pp. 1051-1056, 1998.*

(Continued)

Primary Examiner — Bret P Chen
(74) Attorney, Agent, or Firm — Dority & Manning, P.A.

(57) ABSTRACT

A method for forming a ceramic matrix composite article includes laying up a first group of plies; laying up a second group of plies, the first and second groups of plies being adjacent to each other; compacting the first group of plies and the second group of plies in the same processing step; and performing a first infiltration process on the first group of plies. The method also includes performing a second infiltration process on the second group of plies, the first infiltration process being one of a melt infiltration process or a chemical vapor infiltration process, and the second infiltration process being the other of the melt infiltration process or the chemical vapor infiltration process.

20 Claims, 6 Drawing Sheets

(56) References Cited

U.S. PATENT DOCUMENTS

| | | | |
|---|---|---|---|
| 5,135,695 A | 8/1992 | Marcus | |
| 5,169,579 A | 12/1992 | Marcus et al. | |
| 5,340,656 A | 8/1994 | Sachs et al. | |
| 5,597,435 A * | 1/1997 | Desautels | B29C 33/30 |
| | | | 156/245 |
| 5,639,531 A | 6/1997 | Chen | |
| 5,876,550 A | 3/1999 | Feygin et al. | |
| 7,255,551 B2 | 8/2007 | Taylor et al. | |
| 7,296,398 B2 | 11/2007 | Moniz et al. | |
| 7,427,428 B1 | 9/2008 | DiCarlo et al. | |
| 7,882,693 B2 | 2/2011 | Schilling | |
| 8,206,637 B2 | 6/2012 | Dietrich et al. | |
| 9,074,485 B2 | 7/2015 | Suciu et al. | |
| 9,080,512 B2 | 7/2015 | Suciu et al. | |
| 9,334,743 B2 * | 5/2016 | Alvanos | F01D 5/282 |
| 9,523,149 B2 | 12/2016 | Lazur et al. | |
| 2002/0158946 A1 | 10/2002 | Schulte et al. | |
| 2006/0231975 A1 | 10/2006 | Teulet | |
| 2011/0229337 A1 | 9/2011 | Carper et al. | |
| 2012/0076927 A1 | 3/2012 | Bhatt et al. | |
| 2013/0167374 A1 | 7/2013 | Kirby et al. | |
| 2013/0171426 A1 * | 7/2013 | de Diego | C04B 35/117 |
| | | | 428/182 |
| 2014/0193577 A1 * | 7/2014 | Monaghan | F01D 5/282 |
| | | | 427/248.1 |
| 2014/0301850 A1 * | 10/2014 | Garcia Crespo | F01D 5/081 |
| | | | 416/193 A |
| 2015/0078888 A1 | 3/2015 | Golshany et al. | |
| 2015/0152783 A1 | 6/2015 | Acquisti | |
| 2016/0107940 A1 * | 4/2016 | Lazur | C04B 35/573 |
| | | | 427/249.2 |
| 2016/0159698 A1 | 6/2016 | Landwehr | |
| 2016/0229753 A1 | 8/2016 | Schmidt et al. | |
| 2016/0251269 A1 * | 9/2016 | Luthra | B32B 7/02 |
| | | | 428/212 |
| 2016/0251270 A1 | 9/2016 | Steibel | |
| 2016/0333734 A1 | 11/2016 | Dowden et al. | |
| 2017/0015595 A1 | 1/2017 | Weaver et al. | |
| 2017/0059159 A1 | 3/2017 | Varney | |
| 2017/0136697 A1 | 5/2017 | Kia et al. | |
| 2017/0320785 A1 * | 11/2017 | Matsumoto | F01D 5/02 |

OTHER PUBLICATIONS

Shirvanimoghaddam, Kamyar, et al., "Carbon fiber reinforced metal matrix composites: Fabrication processes and properties". Composites: Part A 92 (2017) 70-96.*

Hillig, William B., et al., "Melt Infiltration Approach to Ceramic Matrix Composites". J. Am. Ceram. Soc., 71 [2] C-96-C-99 (1988).*

Rosso, M., "Ceramic and metal matrix composites: route and properties". 12 International Scientific Conference: Achievements in Mechanical & Materials Engineering. pp. 1-16. No date available.*

U.S. Appl. No. 15/427,324, filed Feb. 8, 2017.

Xu, et al., Carbon/Silicon Carbide Composites Prepared by Chemical Vapor Infiltration Combined with Silicon Melt Infiltration, Carbon, vol. 37, Jan. 1, 1999, pp. 1179-1187, Abstract Only.

Extended European Search Report and Opinion issued in connection with corresponding EP Application No. 18192517.3 dated Nov. 7, 2018.

* cited by examiner

CERAMIC MATRIX COMPOSITE ARTICLES FORMATION METHOD

FIELD

The present disclosure generally relates to ceramic matrix composites (CMC), and more particularly, to methods for forming ceramic matrix composite articles.

BACKGROUND

Ceramic matrix composites generally include a ceramic fiber reinforcement material embedded in a ceramic matrix material. The reinforcement material serves as the load-bearing constituent of the CMC in the event of a matrix crack, while the ceramic matrix protects the reinforcement material, maintains the orientation of its fibers, and serves to dissipate loads to the reinforcement material. Of particular interest to high-temperature applications, such as in gas turbines, are silicon-based composites, which include silicon carbide (SiC) as the matrix and/or reinforcement material.

Different processing methods have been employed in forming CMCs. For example, one approach includes melt infiltration (MI), which employs a molten silicon to infiltrate into a fiber-containing perform. CMCs formed by prepreg MI are generally fully dense, e.g., having generally zero, or less than 3 percent by volume, residual porosity. This very low porosity gives the composite desirable mechanical properties, such as a high proportional limit strength and inter-laminar tensile and shear strengths, high thermal conductivity and good oxidation resistance. However, the matrices of MI composites contain a free silicon phase (i.e., elemental silicon or silicon alloy) that limits the use temperature of the system to below that of the melting point of the silicon or silicon alloy, or about 2550 degrees Fahrenheit to 2570 degrees Fahrenheit. Moreover the free silicon phase caused the MI SiC matrix to have relatively poor creep resistance as operating temperatures approach the melt point.

Another approach for forming CMCs is chemical vapor infiltration (CVI). CVI is a process whereby a matrix material is infiltrated into a fibrous preform by the use of reactive gases at elevated temperature to form the fiber-reinforced composite. Generally, limitations introduced by having reactants diffuse into the preform and by-product gases diffusing out of the perform result in relatively high residual porosity, e.g., of between about 10 percent and about 15 percent in the composite. In particular, typically in forming CMCs using CVI, the inner portion of the composite formed by CVI typically has a higher porosity than the porosity of the outer portion of the composite. The presence of this porosity may degrade the in-plane and through-thickness mechanical strength, thermal conductivity, and oxidation resistance of the CVI CMC relative to MI CMCs. However, CVI composite matrices typically have no free silicon phase, and thus have better creep resistance than MI matrices and the potential to operate at temperatures above 2570 degrees Fahrenheit.

Articles may be formed including a CVI CMC portion and an MI CMC portion. These respective portions may be formed separately and sequentially. However, such a process may be prohibitively time-consuming. Accordingly, a method for forming a CMC article including both a CVI portion and an MI portion in a more efficient manner would be useful.

BRIEF DESCRIPTION

Aspects and advantages of the invention will be set forth in part in the following description, or may be obvious from the description, or may be learned through practice of the invention.

In one exemplary embodiment of the present disclosure, a method for forming a ceramic matrix composite article is provided. The method includes laying up a first group of plies; laying up a second group of plies, the first and second groups of plies being adjacent to each other; compacting the first group of plies and the second group of plies in the same processing step; and performing a first infiltration process on the first group of plies. The method also includes performing a second infiltration process on the second group of plies, the first infiltration process being one of a melt infiltration process or a chemical vapor infiltration process, and the second infiltration process being the other of the melt infiltration process or the chemical vapor infiltration process.

In certain exemplary aspects the first infiltration process is the melt infiltration process, wherein the second infiltration process is the chemical vapor infiltration process, and wherein performing the first infiltration process on the first group of plies includes performing the first infiltration process on the first group of plies prior to performing the second infiltration process on the second group of plies.

For example, in certain exemplary aspects, the method may further include providing a barrier between a least a portion of the first group of plies and the second group of plies.

For example, in certain exemplary aspects performing the first infiltration process on the first group of plies includes performing the melt infiltration process substantially solely on the first group of plies.

In certain exemplary aspects the first infiltration process is the melt infiltration process, wherein the second infiltration process is the chemical vapor infiltration process, and wherein performing the second infiltration process on the second group of plies includes performing the second infiltration process on the second group of plies prior to performing the first infiltration process on the first group of plies.

For example, in certain exemplary aspects performing the second infiltration process on the second group of plies includes covering, at least in part, the first group of plies prior to performing the chemical vapor infiltration process on the second group of plies.

In certain exemplary aspects compacting the first group of plies and the second group of plies in the same processing step includes exposing the first and second groups of plies to temperatures between about 200 degrees Celsius and about 400 degrees Celsius and to pressures between about 100 pounds per square inch (psi) and about 300 psi.

In certain exemplary aspects, the method further includes forming the first group of plies, wherein forming the first group of plies includes passing a first group of tows through a first slurry; and forming the second group of plies, wherein forming the second group of plies includes passing a second group of tows through a second slurry, wherein the first slurry is different than the second slurry.

For example, in certain exemplary aspects the first slurry and second slurry each contain a resin, and wherein the resin has a glass transition temperature between about 100 degrees Celsius and about 300 degrees Celsius.

For example, in certain exemplary aspects the first slurry includes between about ten (10) and about twenty (20)

volume percent of carbon powder added thereto and between about ten (10) and about twenty (20) volume percent of SiC powder added thereto, and wherein the second slurry includes between about five (5) and about twenty (20) volume percent of SiC powder added thereto and less than about five (5) volume percent of carbon powder added thereto.

For example, in certain exemplary aspects the second resin defines a glass transition temperature within about ten percent of a glass transition temperature defined by the first resin.

For example, in certain exemplary aspects the first infiltration process is the melt infiltration process, and wherein the first slurry includes a carbon powder added thereto.

In certain exemplary aspects, the method further includes pyrolyzing the first group of plies and the second group of plies subsequent to compacting the first group of plies and the second group of plies.

In certain exemplary aspects the first group of plies and the second group of plies together form a preform, and the preform has char yield less than about 30% subsequent to pyrolyzing the first group of plies and the second group of plies.

For example, in certain exemplary aspects the preform has char yield between about 10% and about 20%.

In another exemplary aspect of the present disclosure, a method for forming a ceramic matrix composite article is provided. The method includes laying up a first group of plies; laying up a second group of plies, the first and second groups of plies being adjacent to each other; compacting the first group of plies and the second group of plies; pyrolyzing the first group of plies and the second of plies in the same processing step; performing a first infiltration process on the first group of plies; and performing a second infiltration process on the second group of plies, the first infiltration process being one of a melt infiltration process or a chemical vapor infiltration process, and the second infiltration process being the other of the melt infiltration process or the chemical vapor infiltration process.

In certain exemplary aspects pyrolyzing the first group of plies and the second of plies in the same processing step includes pyrolyzing the first group of plies and the second of plies in the same processing step subsequent to compacting the first group of plies and the second group of plies.

In certain exemplary aspects compacting the first group of plies and the second group of plies includes compacting the first group of plies and the second group of plies in the same processing step.

In certain exemplary aspects the first infiltration process is the melt infiltration process, wherein the second infiltration process is the chemical vapor infiltration process, and wherein performing the first infiltration process on the first group of plies includes performing the first infiltration process on the first group of plies prior to performing the second infiltration process on the second group of plies.

In certain exemplary aspects the first infiltration process is the melt infiltration process, wherein the second infiltration process is the chemical vapor infiltration process, and wherein performing the second infiltration process on the second group of plies includes performing the second infiltration process on the second group of plies prior to performing the first infiltration process on the first group of plies.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
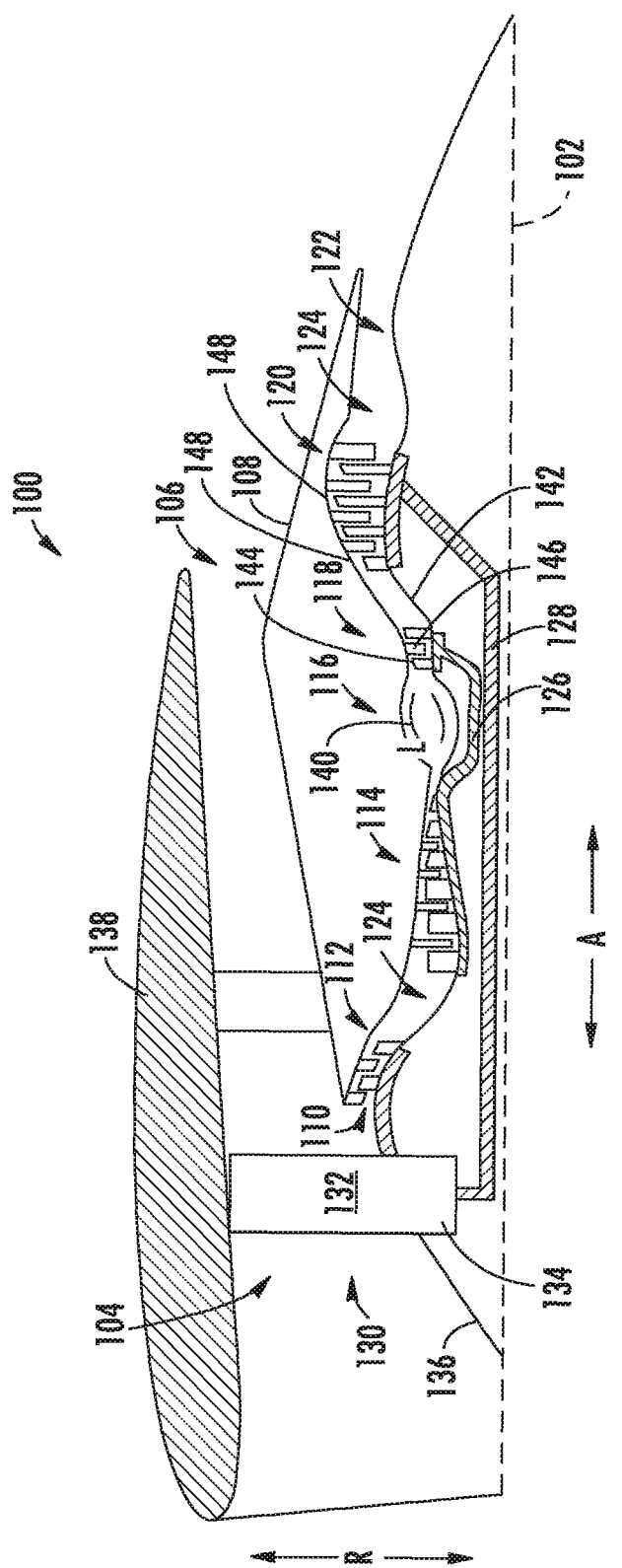
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another, and/or one process step from another process step, and are not intended to signify location, importance, or order of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a simplified, schematic view of a gas turbine engine 100 which may include a CMC article formed in accordance with one or more exemplary aspects of the present disclosure. The exemplary gas turbine engine 100 defines an axial direction A (extending parallel to a longitudinal centerline 102 provided for reference), and a radial direction R. In general, the gas turbine engine 100 includes a fan section 104 and a turbomachine 106 disposed downstream from the fan section 104. The exemplary turbomachine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. The compressor section, combustion section 116, and turbine section together define a core air flowpath 124. A first, high pressure (HP) shaft or spool 126 drivingly connects the HP turbine 118 to the HP compressor 114. A second, low pressure (LP) shaft or spool 128 drivingly connects the LP turbine 120 to the LP compressor 112.

For the embodiment depicted, the fan section 104 includes a fan 130 having a plurality of fan blades 132 coupled to a disk 134 in a spaced apart manner. The disk 134 is covered by rotatable front hub 136 aerodynamically contoured to promote an airflow through the plurality of fan blades 132. Additionally, the exemplary fan section 104 includes an annular fan casing or outer nacelle 138 that circumferentially surrounds the fan 130 and/or at least a portion of the turbomachine 106. As is depicted, the fan blades 132, disk 134, and front hub 136 are together rotatable about the longitudinal axis 102 directly by the LP spool 128.

It will be appreciated, however, that the exemplary gas turbine engine 100 is provided by way of example only, and that in certain exemplary embodiments, the gas turbine engine 100 may have any other suitable configuration and may be configured as any other suitable gas turbine engine, such as an aeronautical gas turbine engine (such as a turbofan engine (depicted), turboprop engine, turboshaft engine, turbojet engine, etc.), a power generation gas turbine engine, or an aeroderivative gas turbine engine.

Referring still to the exemplary gas turbine engine 100 depicted in FIG. 1, during operation certain components may be exposed relatively high temperatures, and therefore it may be beneficial to form one or more of such components of a ceramic matrix composite (CMC) material. For example, within the combustion section 116, a combustor is provided having combustor liners 140, and more specifically, an inner combustor liner and an outer combustor liner. Additionally, within the turbine section of the turbomachine 104, the turbomachine 104 includes one or more liners 142 defining a portion of the core air flowpath 124 therethrough. Although depicted between the HP turbine 118 and LP turbine 120, in other embodiments the liner(s) 142 may be located at any other suitable location along the core air flowpath 124. Also, the HP turbine 118 and LP turbine 120 each include a plurality of turbine nozzles, which may be configured as rotor blades 144 coupled to the HP spool 126 or the LP spool 128, or as stator vanes 146 coupled to casing 108. Moreover, within the HP turbine 118 and LP turbine 120, the turbomachine 106 further includes one or more shrouds 148 positioned at radially outer ends of the plurality of rotor blades 144 to form a seal with such rotor blades 144. As will be discussed below, one or more of these components, as well as one or more other components, may be formed of a CMC material such that it may more ably handle such high temperatures and stresses.

Figure 2:
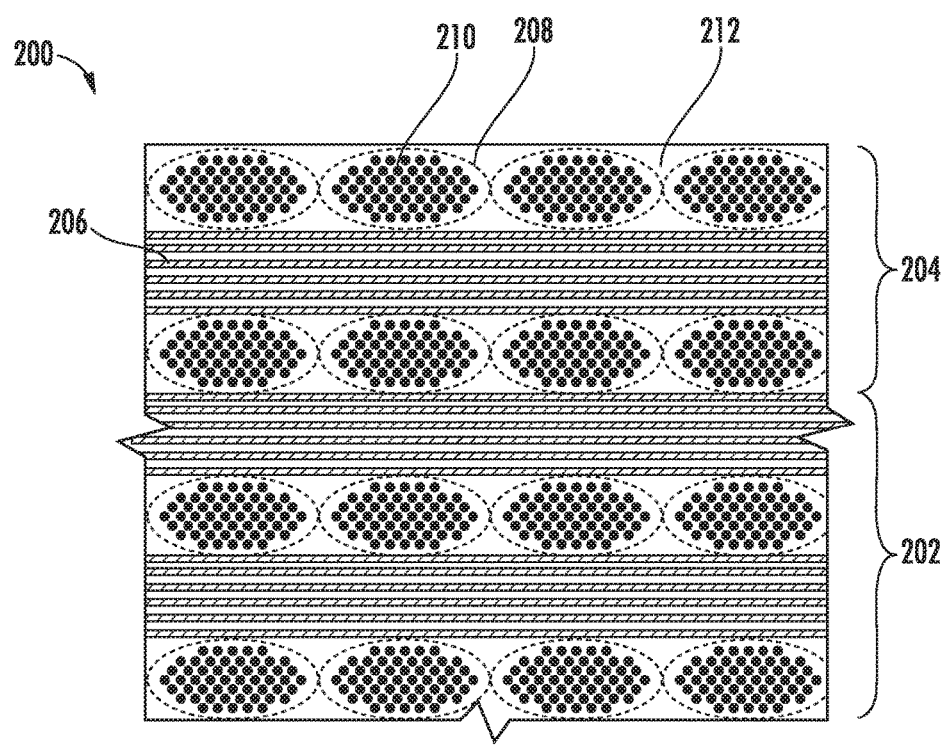
FIG. 2 is a cross-sectional view of a ceramic matrix composite article in accordance with aspects of the present disclosure having a ceramic matrix composite first portion and a ceramic matrix composite second portion.

For example, referring now to FIG. 2, a CMC article 200 is provided as may be incorporated into, e.g., the exemplary gas turbine engine of FIG. 1, or into any other suitable machine or component, in accordance with an exemplary embodiment of the present disclosure. The CMC article 200 generally includes a first CMC portion 202 and a second CMC portion 204.

Each of the first CMC portion 202 and second CMC portion 204 may generally be formed multiple laminae 206, each derived from an individual prepreg that includes unidirectionally-aligned tows 208 impregnated with a ceramic matrix precursor. A layer of prepreg may be referred to as a "ply." As a result, each lamina 206 contains unidirectionally-aligned fibers 210 encased in a ceramic matrix 212 formed by conversion of the ceramic matrix precursor during the various processing steps, as will be explained in detail below. It will be appreciated, however, that in other embodiments, instead of a uni-ply architecture, such as is shown and described, one or both of the first and second CMC portions 202, 204 may be formed of a woven ply architecture (i.e., using woven plies).

Additionally, as will be explained in greater detail below with reference to FIGS. 3 through 6, the CMC article 200 may generally be formed using the same, i.e., combined, processing steps to form both the first and second CMC portions 202, 204, with some variations to differentiate the first CMC portion 202 from the second CMC portion 204. For example, although each of the first CMC portion 202, which includes a first group of plies, and the second CMC portion 204, which includes a second group of plies, will undergo an infiltration process after debulking/compacting and pyrolyzing, the type of infiltration may be varied to result in a CMC article 200 having desired thermal resistance and mechanical properties. For example, in at least certain exemplary aspects, the first CMC portion 202 may be processed at least in part using chemical vapor infiltration (CVI), while the second CMC portion 204 may be processed at least in part using melt infiltration (MI).

With such an exemplary embodiment, during the CVI processing the first CMC portion 202 would be infiltrated using reactive gases at elevated temperature. Generally, limitations introduced by having reactants diffuse into the first CMC portion 202, and by-product gases diffusing out of the first CMC portion 202, result in relatively high residual porosity, e.g., between about 10 percent and about 15 percent, in such portion of the CMC article 200. However, as will be appreciated from the discussion below, the first CMC portion 202 of the CMC article 200, processed using CVI, would typically have little or no free silicon phase, and thus may have better creep resistance and further may have the potential to operate at relatively high temperatures, e.g., temperatures above about 2570 degrees Fahrenheit.

By contrast, during MI processing the second CMC portion 204 would be infiltrated with a molten silicon. The second CMC portion 204, processed using MI, may therefore be generally fully dense, e.g., having generally zero, or less than 3 percent by volume, residual porosity. This very low porosity would give the second CMC portion 204 of the CMC article 200 desirable mechanical properties, such as a high proportional limit strength and interlaminar tensile and shear strengths, high thermal conductivity and good oxidation resistance. However, given the MI processing, the second CMC portion 204 of the CMC article 200 would include a free silicon phase (i.e., elemental silicon or silicon alloy) that limits the use temperature of the second CMC portion 204 to below that of the melting point of the silicon or silicon alloy, or about 2550 degrees Fahrenheit to 2570 degrees Fahrenheit.

It will accordingly be appreciated that the CMC article 200 may therefore be designed to include the first CMC portion 202 in one area and the second CMC portion 204 in another area in order to tailor the properties of the CMC article 200 for its intended use. The resulting CMC article 200 may therefore be capable of withstanding relatively high temperatures, while maintaining desired mechanical properties. Further, although the first CMC portion 202 is described as being processed using CVI processing and the second CMC portion 204 is described as being processed using MI processing, in other embodiments, the infiltration processing methods may be reversed.

Figure 3:
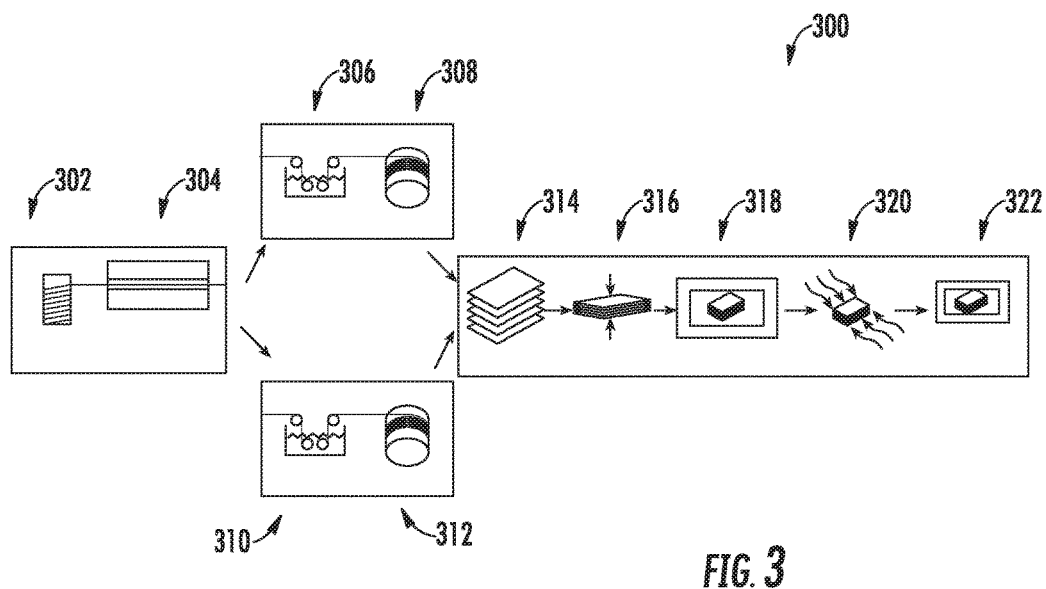
FIG. 3 is a schematic, flow diagram of a process for forming a CMC article in accordance with an exemplary aspect of the present disclosure.

Referring now to FIG. 3, a schematic, flow diagram is provided of a process 300 for forming a CMC article in accordance with an exemplary aspect of the present disclosure. For example, in certain exemplary aspects, the exemplary process 300 depicted schematically in FIG. 3 may be utilized to form the CMC article 200 described above with reference to FIG. 2, as may be incorporated into the exemplary gas turbine engine 100 of FIG. 1. Alternatively, however, the exemplary process 300 depicted schematically in FIG. 3 may be utilized for many other suitable CMC article, as may be incorporated into any other suitable machine (such as a reciprocating engine, or other machine having components exposed to relatively high temperatures).

The process 300 starts with providing at 302 a length of fiber tows. The fiber tows may be provided on a spool, or in any other suitable form. In at least certain exemplary embodiments, a material for the tows may be SiC fibers. An example of a material suitable for the tows is HI-NICA-LON® from Nippon Carbon Co., Ltd. A suitable range for the diameters of the fibers is about two to about twenty micrometers, though fibers with larger and smaller diameters are also within the scope of this disclosure. As is also depicted, the fiber tows may then be coated at 304 with materials to impart certain desired properties to the first CMC portion and/or second CMC portion, such as a carbon or boron nitride interface layer (not shown). However, in other exemplary aspects, any other suitable coating may be applied at 304, or alternatively, process 300 may not include applying a coating at 304.

The process 300 may then be split to form two sets of prepreg tapes or plies. For example, the exemplary process 300 may generally include first forming a first group of plies and second forming a second group of plies. For the embodiment depicted, the first group of plies and the second group of plies each utilize the same fiber tows provided at 302 and coated at 304 (i.e., utilize fiber tows of the same material with the same coating). However, in other exemplary aspects the first group of plies may differ from the second group plies in some manner. For example, in certain exemplary embodiments, the group of plies intended for the melt infiltration process may have an extra coating layer to protect the underlying fiber tows and fiber coatings from the molten silicon.

As is depicted, the exemplary process 300 of FIG. 3 more specifically includes passing a first group of tows through a first slurry at 306 and, for the embodiment depicted, wrapping such first group of tows around a drum at 308, sometimes referred to as a wet drum winding, to form sheets, or plies, for the first group of plies. Similarly, the exemplary process 300 of FIG. 3 includes passing a second group of tows through a second slurry at 310 and, also for the embodiment depicted, wrapping such second group of tows around a drum at 312 to form sheets, or plies, for the second group of plies. The first slurry and second slurry each generally contain a resin and a powder added thereto.

In at least certain exemplary aspects, the resin for the first slurry may be a first resin and the resin for the second slurry may be a second, different resin. The slurry used to form the group of plies which will be subjected to a melt infiltration process, as described below, may have a first resin configured to increase an overall char yield of the structure, which may be due to, e.g., an addition of carbon powder and SiC powder to the resin. By contrast, the slurry used to form the group of plies which will be subjected to a chemical vapor infiltration process, as described below, may have a second resin similarly configured to increase an overall char yield of the structure, which may be due to, e.g., an addition of SiC powder to the resin (and substantially no carbon powder). It will be appreciated, that as used herein, the char yield refers generally to a volume percent of char—whether of a carbon chemistry, a SiC chemistry, a combination of the two, or any other suitable chemistry—in the total final composite structure after the pyrolysis stage and prior to an infiltration stage (discussed in greater detail below).

Regardless, each of the first resin and the second resin will define a similar glass transition temperature, such that the first group of plies and second group of plies may be consolidated and pyrolyzed in a single autoclave cycle, as is discussed below (and such that the first and second resins consistently throughout the entire article when the first and second groups of plies are later compacted). For example, the second resin may define a glass transition temperature within about ten percent of the glass transition temperature of the first resin, such as within about five percent of the glass transition temperature of the first resin. Further, each of the first resin and second resin may define a glass transition temperature between about 100 degrees Celsius and about 300 degrees Celsius, such as between about 150 degrees Celsius and 250 degrees Celsius. Notably, as used herein, the phrase "A being within X percent of B" refers to the absolute value of "(A-B)/A" being less than X percent.

Alternatively, in other exemplary embodiments, the resin of the first slurry and the resin of the second slurry may be the same resin. Such may ensure the resin flows in a desired manner, or more specifically, consistently throughout the entire article when the first and second groups of plies are later compacted (at 316, discussed below). For example, the resin may define a glass transition temperature between about 100 degrees Celsius and about 300 degrees Celsius, such as between about 150 degrees Celsius and 250 degrees Celsius. In certain embodiments, the resin may be an epoxy, however in other embodiments, any other suitable resin may be utilized.

Further, as noted above, the first slurry and the second slurry may differ, however, in the powder that is added thereto. The different powders added to the first slurry and the second slurry may result in the first group of plies being more susceptible to a first infiltration process and the second group plies being more susceptible to a second infiltration process (each discussed in detail below).

More particularly, the slurry that will be used to form the plies that will be subjected to a melt infiltration process may include both a carbon powder and a SiC powder added thereto. By contrast, the slurry that will be used to form the plies subjected to a chemical vapor infiltration process may include a SiC powder added thereto, with substantially no carbon powder added thereto. For example in at least certain exemplary embodiments, the slurry that will be used to form the plies that will be subjected to the melt infiltration process may include between about ten (10) and about twenty (20) volume percent of carbon powder added thereto and between about ten (10) and about twenty (20) volume percent of SiC powder added thereto. By contrast, in at least certain exemplary embodiments, the slurry that will be used to form the plies that will be subjected to the chemical vapor infiltration process may include between about five (5) and about twenty (20) volume percent of SiC powder added thereto and less than about five (5) volume percent of carbon powder added thereto.

Referring still to FIG. 3, at 314 the first and second groups of plies may be stacked, or laid up, in a single processing step, with no intervening processing (e.g., no intermediate compacting, debulking, or pyrolyzing). More specifically, the first group plies may be stacked, or laid up, around or within a mold to begin forming a shape of the CMC article, and the second group of plies may be stacked, or laid up, over at least a portion of the first group of plies without waiting for the first group of plies to go through an individual debulking and pyrolyzing process. In such a manner, the first and second groups of plies may be adjacent to one another, and more specifically, for the exemplary aspect depicted the first and second groups of plies may contact one another. Notably, the plies of the first and second groups are typically arranged so that tows of the adjacent plies are oriented transverse (e.g., perpendicular) or at an angle to each other, providing greater strength in a laminar plane (corresponding to the principal (load-bearing) directions of the final CMC article). However, in other aspects, they may be arranged in any suitable manner. Additionally, it will be appreciated that the compacting of the first and second group of plies at 316 may be performed at elevated temperatures to enable pyrolyzing the pre-form. This may involve removing solvents, and may include cross-linking the polymers.

After the first and second groups of plies are laid up at 314, the exemplary process 300 of FIG. 3 additionally includes at 316 compacting the first group of plies and the second group of plies substantially simultaneously in a single processing step, with no intervening processing (e.g., no intervening pyrolyzing, additional layup, etc.), to form a laminate preform. More specifically, the compacting of the first and second groups of plies at 316 may include exposing the first and second groups of plies to elevated temperatures and pressures, such as may be achieved within an autoclave. The compacting of the first and second groups of plies at 316 may also be referred to as debulking.

After the first and second groups of plies are compacted at 316, the exemplary process 300 of FIG. 3 includes at 318 pyrolyzing the preform including the first and second groups of plies (i.e., subjecting the first and second groups of plies to pyrolysis, sometimes also referred to as pyrolyzing the preform). Pyrolyzing the preform (sometimes also referred to as "burning out" the preform) including the first and second groups of plies at 318 may include exposing the preform including the first and second groups of plies to progressively higher temperatures to decompose certain compounds within the preform. In at least certain exemplary aspects, pyrolyzing the preform including the first and second groups of plies preform may occur in vacuum or in an inert atmosphere in order to decompose the organic binders, at least one of which pyrolyzes during this heat treatment to form a ceramic char, and produce a porous layer, which will be addressed/utilized during subsequent processing/infiltration steps. Accordingly, it will be appreciated that the preform defines a char yield after pyrolyzing the preform. The char yield, in volume percent of the preform, may be between five percent and forty percent, such as less than thirty-five percent, such as less than thirty percent, such as less than twenty-five percent, such as between about ten percent and about twenty percent. Such may be due to the selection of resin(s) and any powder, such as carbon powder and/or SiC powder, added thereto.

Moreover, it will be appreciated that subsequent to the compacting and pyrolyzing of the preform at 316 and 318, the preform is subjected to various infiltration processes to impart desired mechanical and/or thermal resistance properties to the resulting CMC article. More specifically, for the exemplary aspect of the process 300 depicted in FIG. 3, the process 300 includes at 320 performing a first infiltration process on the first group of plies, which for the example aspect depicted is a chemical vapor infiltration (CVI) process, and subsequently at 322 performing a second infiltration process on the second group applies, which for the exemplary aspect depicted is a melt infiltration (MI) process.

Referring first to the performance of the first infiltration process at 320, the CVI process may generally include heating in an independent subsequent heating step (at least for the exemplary aspect depicted), the preform and infiltrating the first group of plies of the preform with a chemical vapor, such as with a gaseous source of silicon carbide supplied externally. Appropriate reactant gases and processing conditions for performance of the CVI process are well known in the art. The gaseous source of silicon carbide infiltrates into the porosity, reacts on the internal surfaces of the porous first portion to deposit SiC with no free Si metal.

In at least certain exemplary aspects, it may be intended for the process 300 to perform the CVI process substantially completely on the first group of plies, and at most partially on a portion on the second group of plies. Accordingly, in at least certain exemplary aspects, performing the CVI process at 320 may include covering an outside surface of the second group of plies with a solid tool, such as a solid metal tool, such that the chemical vapor is directed towards the first group of plies does not directly contact the outside surface of the second group of plies. Additionally, the CVI process at 320 may be performed for an amount of time determined to allow for the local vapor to penetrate substantially completely through a depth of the preform associated with the first group of plies without reaching a substantial portion of the second group of plies.

Notably, it will be appreciated that for the exemplary aspect of the method 300 depicted, the first slurry to which the first group of tows were passed through may include the silicon-carbide powder added thereto, which may result in the first group of plies containing a desired chemical composition and pore size distribution subsequent to the compacting step at 316 and pyrolyzing step at 318 such that it may fill to the extent possible with SiC deposited from the chemical vapor supplied during the CVI process at 320.

Referring now to the performance of the second infiltration process at 320, which for the exemplary aspect depicted occurs after the first infiltration process at 320, the MI process at 322 may generally include heating, e.g., in an independent subsequent heating step, the preform and infiltrating the preform with molten silicon supplied externally. The molten silicon infiltrates into the porosity, reacts with the carbon constituent of the matrix to form silicon carbide, and fills the porosity to yield the desired CMC article.

Notably, it will be appreciated that for the exemplary aspect of the method 300 depicted, the second slurry to which the second group of tows were passed through may include the carbon powder added thereto, which may result in the second group of plies containing a desired chemical composition subsequent to the compacting step at 316 and pyrolyzing step at 318 such that it may react in a desired manner to the, e.g., molten silicon, supplied during the MI process at 322.

Forming a CMC article in accordance with the exemplary process 300 depicted in FIG. 3 may result in a CMC article having desired mechanical and thermal resistance properties by virtue of the separate melt infiltrated portion and chemical vapor infiltrated portion. Moreover, given that the first and second groups of plies are laid up, compacted, and pyrolized together in single steps, the exemplary process 300 may allow for a more efficient process for forming the CMC article.

It should be appreciated, however, that the exemplary process 300 described above, and depicted in FIG. 3 is by way of example only. In other exemplary aspects, the process 300 may include any other suitable steps, may include variants of the above described exemplary steps, may not include each of the exemplary steps described above, or may include one or more of the steps in different orders.

Figure 4:
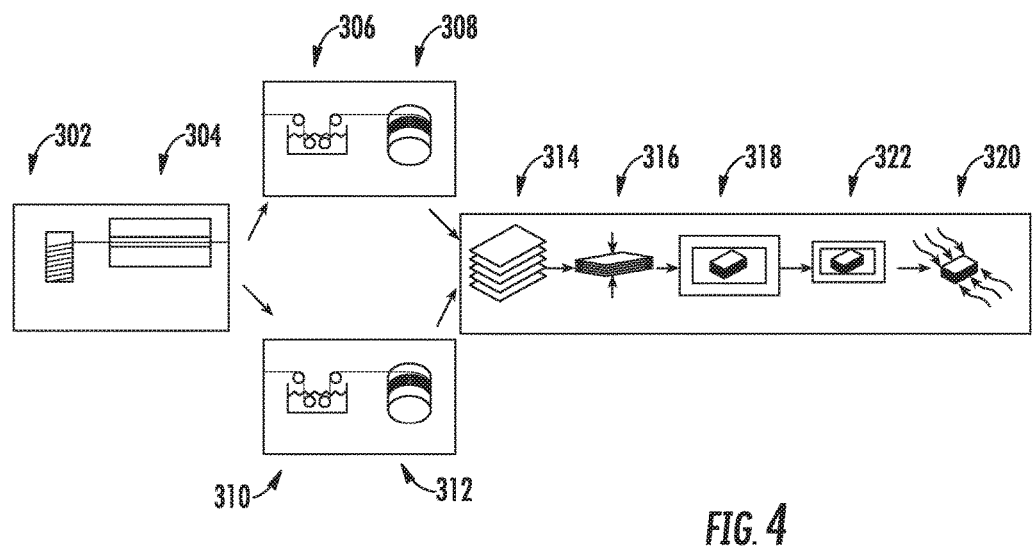
FIG. 4 is a schematic, flow diagram of a process for forming a CMC article in accordance with another exemplary aspect of the present disclosure.

For example, referring now to FIG. 4, another exemplary aspect of the process 300 described above with reference to FIG. 3 is provided. More specifically, FIG. 4 provides a schematic, flow diagram of a process 300 for forming a CMC article in accordance with another exemplary aspect of the present disclosure. The exemplary aspect of the process 300 depicted in FIG. 4 may be substantially the same as the exemplary aspect of the process 300 described above with reference to FIG. 3. Accordingly, the same numbers may refer to the same steps.

For example, the exemplary process 300 of FIG. 4 starts with providing at 302 a length of fiber tows and coating the fiber tows at 304 with materials to impart certain desired properties to the first CMC portion and/or second CMC portion. The process 300 may then be split to form two sets of prepreg tapes or plies. For example, the exemplary process 300 of FIG. 4 includes passing a first group of tows through a first slurry path at 306 and wrapping such first group of tows around a drum at 308 to form plies for the first group of plies. Similarly, the exemplary process 300 of FIG. 4 includes passing a second group of tows through a second slurry path at 310 and wrapping such second group of tows around a drum at 312 to form plies for the second group of plies.

Figure 5:
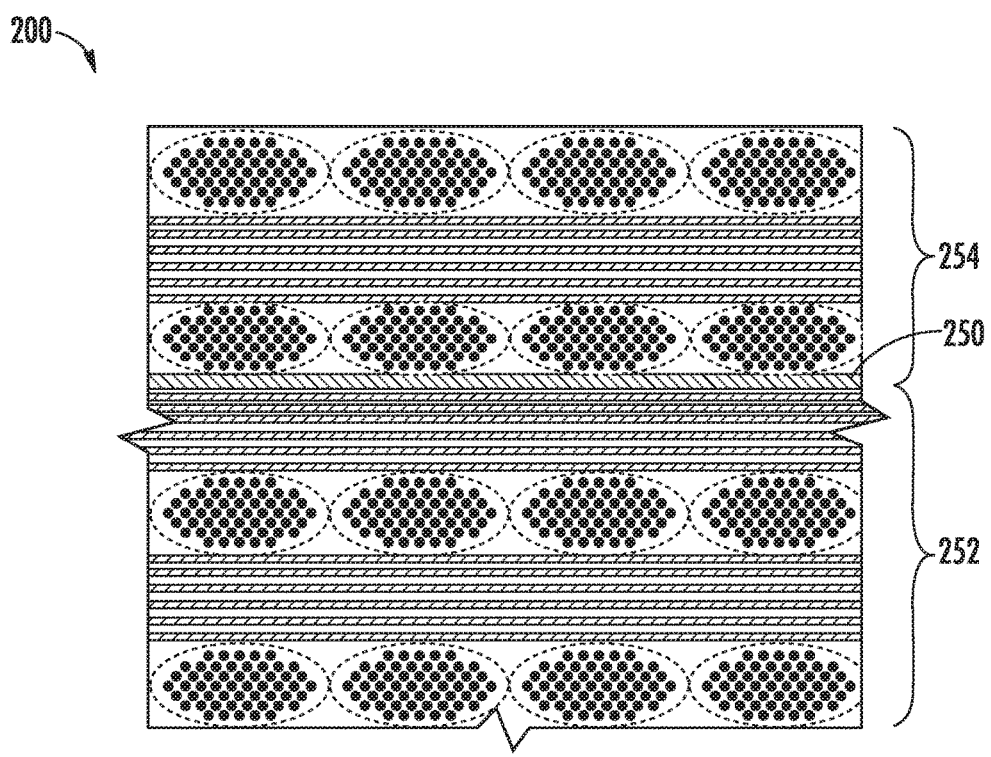
FIG. 5 is a cross-sectional view of a ceramic matrix composite article in accordance with another aspect of the present disclosure.

At 314, the first and second groups of plies may be stacked, or laid up, in a single processing step, with no intervening processing. As will be discussed below, in certain exemplary aspects, the exemplary process 300 of FIG. 4 may include performing melt infiltration prior to performing chemical vapor infiltration. In order to reduce a likelihood of the melt infiltration process seeping, more than desired, into the group of CMC plies to be processed using chemical vapor infiltration, the exemplary process 300 of FIG. 4, and more specifically, laying up the first and second groups of plies at 314, may include providing a barrier between at least a portion of the first group of plies and the second group of plies. Referring briefly to FIG. 5, such a configuration is depicted. More specifically, FIG. 5 depicts a CMC article 200 including a barrier layer 250 positioned between a first group of plies 252 and a second group of plies 254. The barrier layer 250 may prevent or limit, e.g., molten silicon during the melt infiltration from passing therethrough such that the melt infiltration does not affect the group of plies to be processed using chemical vapor infiltration.

Referring still to FIG. 4, the exemplary process 300 additionally includes at 316 compacting the first group of plies and the second group of plies simultaneously in a single processing step, with no intervening processing, to form a laminate preform, and at 318 pyrolyzing the preform including the first and second groups of plies (i.e., subjecting the first and second groups of plies to pyrolysis).

Similar to the exemplary process 300 described above with reference to FIG. 3, the exemplary process 300 of FIG. 4 includes further processing of the compacted and pyrolyzed preform utilizing various infiltration processes to impart desired mechanical and/or thermal resistance properties to the resulting CMC article. However, by contrast to the exemplary aspect of the process 300 described above with reference to FIG. 3, the exemplary aspect of the process 300 depicted in FIG. 4 includes performing at 322 a melt infiltration process on the second group of plies prior to performing at 320 a chemical vapor infiltration process on the first group of plies. Notably, with such an exemplary aspect, the inclusion of the barrier layer in the laying of process at 314 (discussed above) may ensure that the melt infiltration does not seep into an undesirable amount of the first group of plies to be processed using chemical vapor infiltration. It will further be appreciated that with such an exemplary aspect, the first slurry may include a silicon-carbide powder added thereto and the second slurry may include a carbon power added thereto.

Forming a CMC article in accordance with the exemplary process 300 depicted in FIG. 4 may result in a CMC article having desired mechanical and thermal resistance properties by virtue of the separate melt infiltrated portion and chemical vapor infiltrated portion. Moreover, given that the first and second groups of plies are laid up, compacted, and pyrolyzed together in single steps, the exemplary process 300 may allow for a more efficient process for forming the CMC article.

Figure 6A:
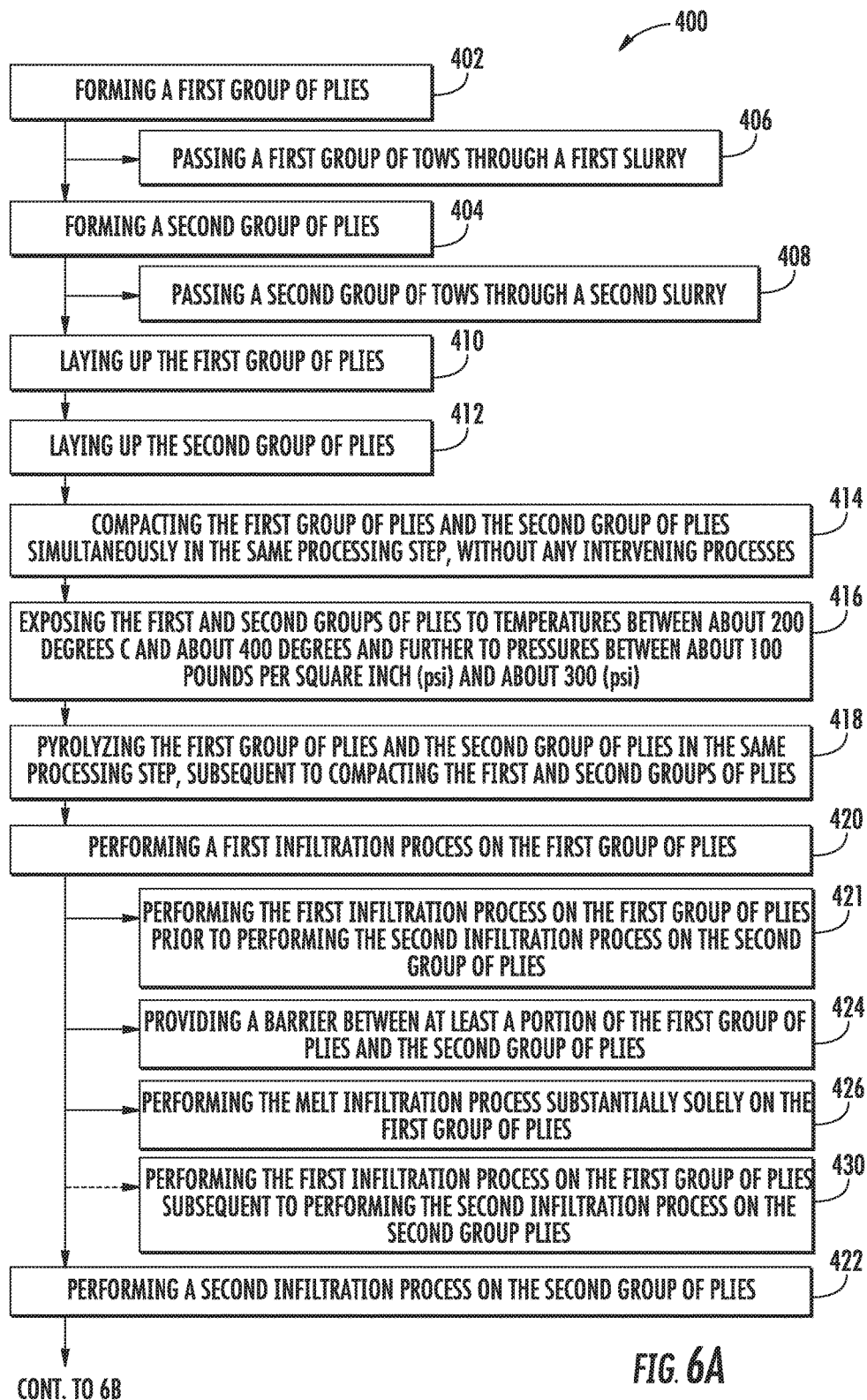
FIGS. 6A and 6B are flow diagrams of a method for forming a CMC article in accordance with an exemplary aspect of the present disclosure.
Figure 6B:
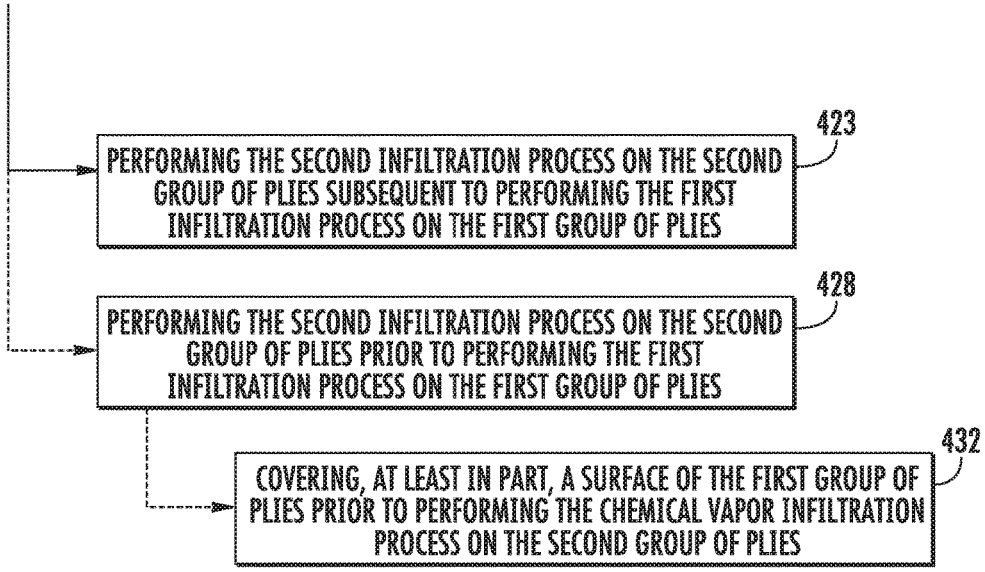

Referring now to FIGS. 6A and 6B, a flowchart is provided of a method 400 for forming a ceramic matrix composite (CMC) article in accordance with an exemplary aspect of the present disclosure. The exemplary method 400 of FIGS. 6A and 6B may be utilized to form the exemplary CMC article 200 described above with reference to FIG. 2, as may be incorporated in the exemplary gas turbine engine of FIG. 1, or into any other suitable machine. Notably, in certain exemplary aspects, the method 400 of FIGS. 6A and 6B may utilize one or more the exemplary aspects of the method 300 described above with reference to FIGS. 3 and 4.

As is depicted, the exemplary method 400 generally includes at (402) forming a first group of plies and at (404) forming a second group of plies. More specifically, for the exemplary aspect depicted, forming the first group of plies at (402) includes at (406) passing a first group of tows through a first slurry, and similarly, forming the second group of plies at (404) includes at (408) passing a second group of tows through a second slurry path. For the exemplary aspect depicted, the first slurry is different than the second slurry path. However, each of the first and second slurrys contain a resin (i.e., the same resin for at least certain exemplary aspects), with the resin having a glass transition temperature between about 150 degrees Celsius and about 250 degrees Celsius. Further, as will be explained in greater detail below, the first slurry includes one of a carbon powder or a silicon-carbide powder added thereto and the second slurry includes the other of the carbon powder or the silicon-carbide powder added thereto. The type of powder added to the slurry may affect a susceptibility of the resulting plies to a type of infiltration process, described below.

Referring still to the exemplary method 400 depicted in FIGS. 6A and 6B, the method 400 further includes at (410) laying up the first group of plies and at (412) laying up the second group of plies. In such a manner, the first group of plies and second group of plies may be adjacent to one another, or more specifically, may be in contact with one another. However, in other exemplary aspects, the method 400 may include providing a barrier layer between the first group of plies and the second group of plies. Notably, laying up the first group of plies at (410) and laying up the second group applies at (412) may occur sequentially during the same processing step, e.g., with no intervening processing, such as debulking, pyrolyzing, and the like.

Further, the exemplary method 400 includes at (414) compacting the first group of plies and the second group of plies simultaneously in the same processing step, without any intervening processes. More specifically, for the exemplary aspect depicted, compacting the first group of plies and the second group of plies simultaneously in the same processing step at (414) includes exposing the first and second groups of plies to elevated temperatures and pressures, such as may be achieved in an autoclave. More specifically, still, for the exemplary aspect depicted, compacting the first group of plies and the second group of plies simultaneously in the same processing step at (414) includes at (416) exposing the first and second groups of plies to temperatures between about 200 degrees Celsius degrees and about 400 degrees Celsius degrees, and further to pressures between about 100 pounds per square inch (psi) and about 300 psi.

Moreover, the exemplary method 400 includes at (418) pyrolyzing the first group of plies and the second group of plies in the same processing step, subsequent to compacting the first and second groups of plies at (414). For example, in certain exemplary aspects, pyrolyzing the first and second groups of plies at (418) may include exposing the first and second groups of plies to elevated temperatures to cure the preform (i.e., the compacted first and second groups of plies) and decompose certain compounds within the preform. In at least certain exemplary aspects, pyrolyzing the first and second groups of plies at (418) may occur in vacuum or in an inert atmosphere in order to decompose the organic binders, at least one of which pyrolyzes during this heat treatment to form a ceramic char, and produce a porous layer.

It should be appreciated that the pyrolyzing of the first and second groups of plies in the same processing step at (418) may be enabled by the utilization of the same resin in the first and second slurrys. More specifically, utilizing the same resin in the first and second slurrys may ensure the resin flow in a consistent manner during the pyrolyzing of the first and second groups of plies at (418). Notably, however, in other exemplary aspects, different resins may be utilized, provided they flow in a consistent manner.

Referring still to the exemplary aspect of the method 400 depicted in FIGS. 6A and 6B, the method 400 further includes at (420) performing a first infiltration process on the first group of plies and at (422) performing a second infiltration process on the second group of plies. The first infiltration process is at least one of a melt infiltration process or a chemical vapor infiltration process, and the second infiltration process is the other of the melt infiltration process or the chemical vapor infiltration process.

More specifically, for the exemplary aspect depicted, the first infiltration process is the melt infiltration process and the second infiltration process is the chemical vapor infiltration process. Accordingly, with such an exemplary aspect, performing the first infiltration process on the first group of plies at (420) includes performing the melt infiltration process on the first group of plies, and performing the second infiltration process on the second group of plies at (422) includes performing the chemical vapor infiltration process on the second group of plies.

Further, for the exemplary aspect depicted, performing the first infiltration process on the first group of plies at (420) includes at (421) performing the first infiltration process on the first group of plies prior to performing the second infiltration process on the second group of plies at (422). Similarly, performing the second infiltration process on the second group of plies at (422) includes at (423) performing the second infiltration process on the second group of plies subsequent to performing the first infiltration process on the first group of plies at (420).

Notably, for the exemplary aspect depicted, performing the first infiltration process on the first group of plies at (420) further includes at (424) providing a barrier between at least a portion of the first group of plies and the second group of plies, and at (426) performing the melt infiltration process substantially solely on the first group of plies. Notably, however, in other exemplary aspects, the method 400 may not include providing the barrier between at least a portion of the first group of plies and the second group of plies, and further, at least a portion of the melt infiltration process may seep into the second group of plies.

It will also be appreciated that, as discussed above, the first group of plies may be prepared in a manner such that they are more susceptible to the melt infiltration process, and similarly, the second group of plies may be prepared in a manner such that they are more susceptible to the chemical vapor infiltration process. Specifically, for the exemplary aspect depicted, the first slurry through which the first group of tows is passed through at (406) includes a carbon powder added thereto, and further, the second slurry through which the second group of tows is passed through at (408) includes a silicon carbide powder added thereto. As will be appreciated, such may ensure the first group of plies includes a desired amount of carbon to react with, e.g., the molten silicon during the melt infiltration process, and further that the second group of plies includes a desired amount of silicon-carbide during to the chemical vapor infiltration process.

It should be appreciated, however, that in other exemplary aspects, the exemplary method 400 include any other suitable steps, or may perform one or more the above steps in any other suitable manner/order. For example, in certain exemplary aspects, the order of the performance of the first and second infiltration processes at (420) and (422) may be reversed. More specifically, in at least certain exemplary aspects, as is depicted in phantom, performing the second infiltration process on the second group plies at (422) may include at (428) performing the second infiltration process on the second group plies prior to performing the first infiltration process on the first group of plies at (420). Similarly, with such an exemplary aspect, performing the first infiltration process on the first group of plies at (420) may include at (430) performing the first infiltration process on the first group of plies subsequent to performing the second infiltration process on the second group of plies at (422). With such an exemplary aspect, performing the second infiltration process on the second group of plies prior to performing the first infiltration process on the first group of plies at (428) may include at (432) covering, at least in part, a surface of the first group of plies prior to performing the chemical vapor infiltration process on the second group of plies. Such may ensure the chemical vapor utilized in the chemical vapor infiltration process does not substantially infiltrate into the first group of plies.

Notably, in at least certain situations, it may be preferable to perform a chemical vapor infiltration process on a first group of plies prior to performing a melt infiltration process on the remaining, second group of plies. When performed in such order, the chemical vapor infiltration process may at least partially fill a portion of a porosity of the second group of plies, and the subsequent performance of the melt infiltration process may then completely fill the remaining porosity in the second group of plies. This will create a "transition region" with such plies having a partial CVI and MI matrix.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a ceramic matrix composite article comprising:
    laying up a first group of plies;
    laying up a second group of plies, the first and second groups of plies being adjacent to each other;
    compacting the first group of plies and the second group of plies in the same processing step;
    performing a first infiltration process on the first group of plies subsequent to compacting the first group of plies and the second group of plies in the same processing step; and
    performing a second infiltration process on the second group of plies subsequent to compacting the first group of plies and the second group of plies in the same processing step, the first infiltration process being one of a melt infiltration process or a chemical vapor infiltration process, and the second infiltration process being the other of the melt infiltration process or the chemical vapor infiltration process.

2. The method of claim 1, wherein the first infiltration process is the melt infiltration process, wherein the second infiltration process is the chemical vapor infiltration process, and wherein performing the first infiltration process on the first group of plies comprises performing the first infiltration process on the first group of plies prior to performing the second infiltration process on the second group of plies.

3. The method of claim 2, further comprising:
    providing a barrier between a least a portion of the first group of plies and the second group of plies.

4. The method of claim 2, wherein performing the first infiltration process on the first group of plies comprises performing the melt infiltration process substantially solely on the first group of plies.

5. The method of claim 1, wherein the first infiltration process is the melt infiltration process, wherein the second infiltration process is the chemical vapor infiltration process, and wherein performing the second infiltration process on the second group of plies comprises performing the second infiltration process on the second group of plies prior to performing the first infiltration process on the first group of plies.

6. The method of claim 5, wherein performing the second infiltration process on the second group of plies comprises covering, at least in part, the first group of plies prior to performing the chemical vapor infiltration process on the second group of plies.

7. The method of claim 1, wherein compacting the first group of plies and the second group of plies in the same processing step comprises exposing the first and second groups of plies to temperatures between about 200 degrees Celsius and about 400 degrees Celsius and to pressures between about 100 pounds per square inch (psi) and about 300 psi.

8. The method of claim 1, further comprising:
    forming the first group of plies, wherein forming the first group of plies comprises passing a first group of tows through a first slurry; and
    forming the second group of plies, wherein forming the second group of plies comprises passing a second group of tows through a second slurry, wherein the first slurry is different than the second slurry.

9. The method of claim 8, wherein the first slurry and second slurry each contain a resin, and wherein the resin has a glass transition temperature between about 100 degrees Celsius and about 300 degrees Celsius.

10. The method of claim 9, wherein the preform has char yield between about 10% and about 20%.

11. The method of claim 8, wherein the first slurry includes between about ten (10) and about twenty (20) volume percent of carbon powder added thereto and between about ten (10) and about twenty (20) volume percent of SiC powder added thereto, and wherein the second slurry includes between about five (5) and about twenty (20) volume percent of SiC powder added thereto and less than about five (5) volume percent of carbon powder added thereto.

12. The method of claim 11, wherein the second resin defines a glass transition temperature within about ten percent of a glass transition temperature defined by the first resin.

13. The method of claim 8, wherein the first infiltration process is the melt infiltration process, and wherein the first slurry includes a carbon powder added thereto.

14. The method of claim 1, further comprising:
    pyrolyzing the first group of plies and the second group of plies in the same processing step subsequent to compacting the first group of plies and the second group of plies in the same processing step.

15. The method of claim 14, wherein the first group of plies and the second group of plies together form a preform, and wherein the preform has char yield less than about 30% subsequent to pyrolyzing the first group of plies and the second group of plies.

16. A method for forming a ceramic matrix composite article comprising:
    laying up a first group of plies;
    laying up a second group of plies, the first and second groups of plies being adjacent to each other;
    compacting the first group of plies and the second group of plies;
    pyrolyzing the first group of plies and the second of plies in the same processing step;
    performing a first infiltration process on the first group of plies subsequent to pyrolyzing the first group of plies and the second of plies in the same processing step; and performing a second infiltration process on the second group of plies subsequent to pyrolyzing the first group of plies and the second of plies in the same processing step, the first infiltration process being one of a melt infiltration process or a chemical vapor infiltration process, and the second infiltration process being the other of the melt infiltration process or the chemical vapor infiltration process.

17. The method of claim 16, wherein pyrolyzing the first group of plies and the second of plies in the same processing step comprises pyrolyzing the first group of plies and the second of plies in the same processing step subsequent to compacting the first group of plies and the second group of plies.

18. The method of claim 16, wherein compacting the first group of plies and the second group of plies comprises compacting the first group of plies and the second group of plies in the same processing step.

19. The method of claim 16, wherein the first infiltration process is the melt infiltration process, wherein the second infiltration process is the chemical vapor infiltration process, and wherein performing the first infiltration process on the first group of plies comprises performing the first infiltration process on the first group of plies prior to performing the second infiltration process on the second group of plies.

20. The method of claim 16, wherein the first infiltration process is the melt infiltration process, wherein the second infiltration process is the chemical vapor infiltration process, and wherein performing the second infiltration process on the second group of plies comprises performing the second infiltration process on the second group of plies prior to performing the first infiltration process on the first group of plies.

* * * * *